United States Patent
Jung et al.

(10) Patent No.: US 10,398,252 B2
(45) Date of Patent: Sep. 3, 2019

(54) COFFEE EXTRACTION DEVICE

(71) Applicant: COWAY CO., LTD., Chungcheongnam-do (KR)

(72) Inventors: Woong Jung, Seoul (KR); Hee-Do Jung, Seoul (KR); Young-Hoon Hong, Seoul (KR); Jin-Woo Choi, Seoul (KR)

(73) Assignee: Coway Co., Ltd (KR)

( * ) Notice: Subject to any disclaimer, the term of this patent is extended or adjusted under 35 U.S.C. 154(b) by 454 days.

(21) Appl. No.: 15/038,271

(22) PCT Filed: Dec. 1, 2014

(86) PCT No.: PCT/KR2014/011638
§ 371 (c)(1),
(2) Date: May 20, 2016

(87) PCT Pub. No.: WO2015/084005
PCT Pub. Date: Jun. 11, 2015

(65) Prior Publication Data
US 2016/0296059 A1    Oct. 13, 2016

(30) Foreign Application Priority Data

Dec. 4, 2013 (KR) .................. 10-2013-0149952
Nov. 26, 2014 (KR) .................. 10-2014-0166753

(51) Int. Cl.
A47J 31/44    (2006.01)
A47J 31/46    (2006.01)
A47J 31/36    (2006.01)

(52) U.S. Cl.
CPC ........... *A47J 31/3628* (2013.01); *A47J 31/46* (2013.01)

(58) Field of Classification Search
CPC .................. A47J 31/46; A47J 31/54
See application file for complete search history.

(56) References Cited

U.S. PATENT DOCUMENTS 5,083,504 A * 1/1992 Koga ............... A47J 31/32
99/295
5,337,652 A * 8/1994 Fischer ............ A47J 31/32
99/281
(Continued)

FOREIGN PATENT DOCUMENTS

CN    101272718    9/2008
CN    101965144    2/2011
(Continued)

OTHER PUBLICATIONS

European Search Report dated Oct. 27, 2016 issued in counterpart application No. 14867448.4-1656, 6 pages.
(Continued)

*Primary Examiner* — Dana Ross
*Assistant Examiner* — Lawrence H Samuels
(74) *Attorney, Agent, or Firm* — The Farrell Law Firm, P.C.

(57) ABSTRACT

A coffee extraction device is disclosed. A coffee extraction device according to an embodiment of the present invention comprises: a pump which is connected to a water supply source and pressurizes water supplied from the water supply source; a heater for heating the water pressurized by the pump; a coffee extraction unit for extracting coffee using the water heated by the heater; and a discharge member for discharging the coffee, which has been extracted by the coffee extraction unit, to the outside, wherein a vent valve may be provided between the heater and the coffee extraction unit, the vent valve being closed during coffee extraction and being opened after coffee extraction.

16 Claims, 13 Drawing Sheets

(56) References Cited

U.S. PATENT DOCUMENTS

| | | | |
|---|---|---|---|
| 8,590,443 B2* | 11/2013 | Mahlich | A47J 31/3671 99/290 |
| 9,101,242 B2* | 8/2015 | Kooijker | A47J 31/0647 |
| 9,420,911 B2* | 8/2016 | Bombeck | A47J 31/24 |
| 9,486,107 B2* | 11/2016 | Kobylarz | A47J 31/0576 |
| 2005/0066820 A1 | 3/2005 | Lussi | |
| 2005/0188854 A1* | 9/2005 | Green | A47J 31/002 99/275 |
| 2006/0090653 A1* | 5/2006 | McDuffie | A47J 31/4407 99/279 |
| 2007/0012194 A1* | 1/2007 | Oehninger | A47J 31/3609 99/279 |
| 2007/0056994 A1 | 3/2007 | Woodnorth et al. | |
| 2008/0072766 A1* | 3/2008 | Kobylarz | A47J 31/0576 99/279 |
| 2010/0024658 A1* | 2/2010 | Jacobs | A47J 31/46 99/302 R |
| 2010/0126354 A1* | 5/2010 | Mahlich | A47J 31/3671 99/293 |
| 2010/0212509 A1* | 8/2010 | Tien | A47J 31/0605 99/305 |
| 2011/0000376 A1* | 1/2011 | Kooijker | A47J 31/0647 99/283 |
| 2013/0220137 A1* | 8/2013 | Bombeck | A47J 31/46 99/287 |
| 2013/0263745 A1* | 10/2013 | Bombeck | A47J 31/24 99/293 |
| 2014/0348996 A1* | 11/2014 | Fischer | A47J 31/34 426/433 |

FOREIGN PATENT DOCUMENTS

| | | |
|---|---|---|
| CN | 102112026 | 6/2011 |
| EP | 0236549 | 9/1987 |
| EP | 1074207 | 2/2001 |
| JP | 2005-261835 | 9/2005 |
| KR | 1020050044530 | 5/2005 |
| KR | 1020050105067 | 11/2005 |
| KR | 1020100121538 | 11/2010 |
| KR | 1020120114741 | 10/2012 |
| WO | WO 02/087399 | 11/2002 |
| WO | WO 2009109922 | 9/2009 |

OTHER PUBLICATIONS

Korean Office Action dated Nov. 29, 2017 issued in counterpart application No. 10-2014-0166753, 4 pages.

Chinese Office Action dated Feb. 5, 2018 issued in counterpart application No. 201480064158.3, 10 pages.

* cited by examiner

[Figure 1]
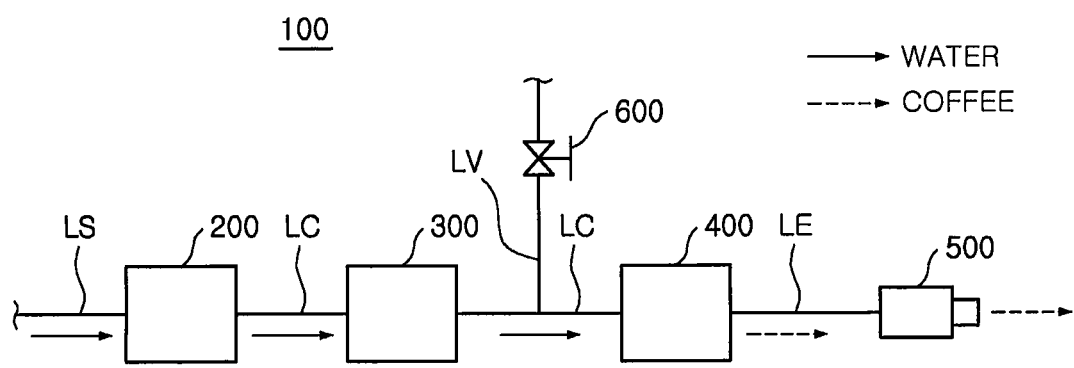

[Figure 2]
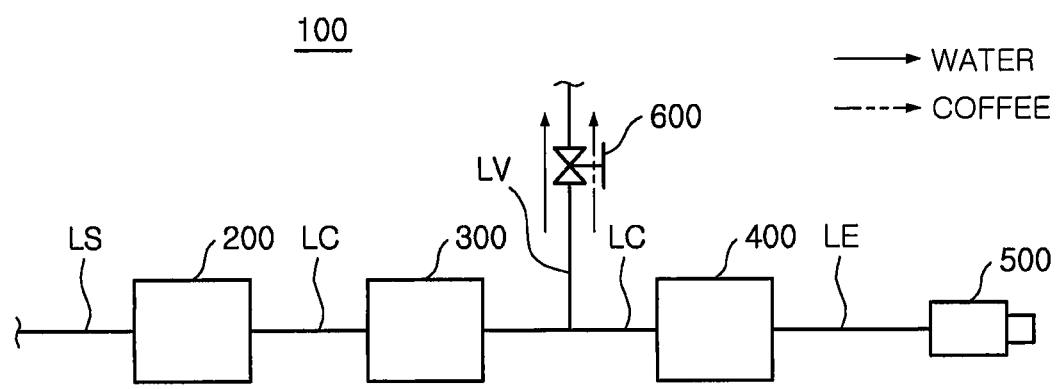

[Figure 3]
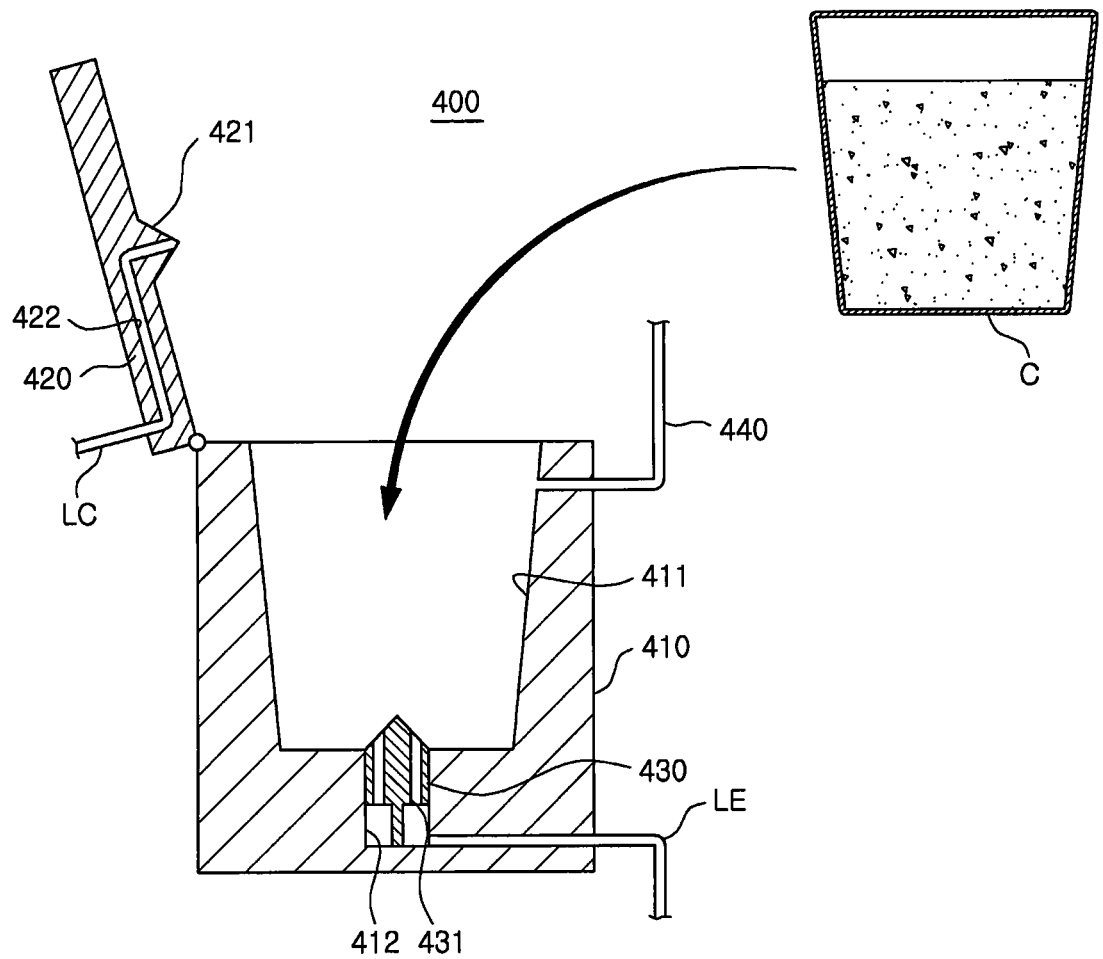

[Figure 4]
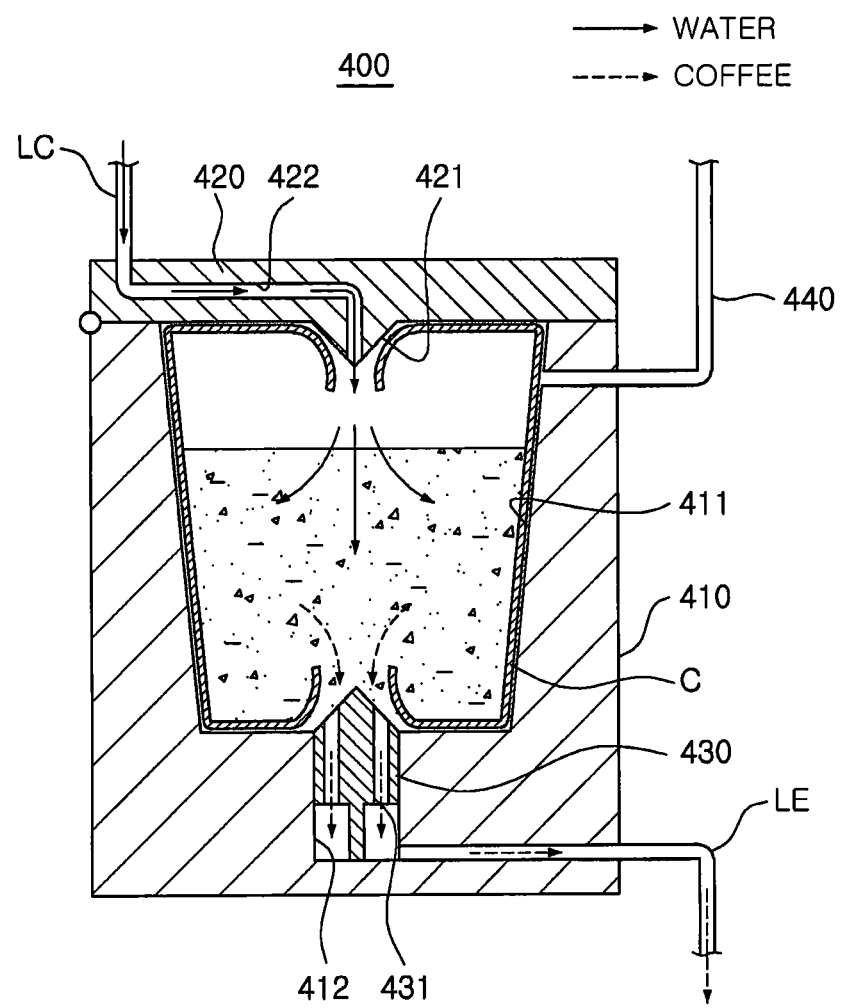

[Figure 5]
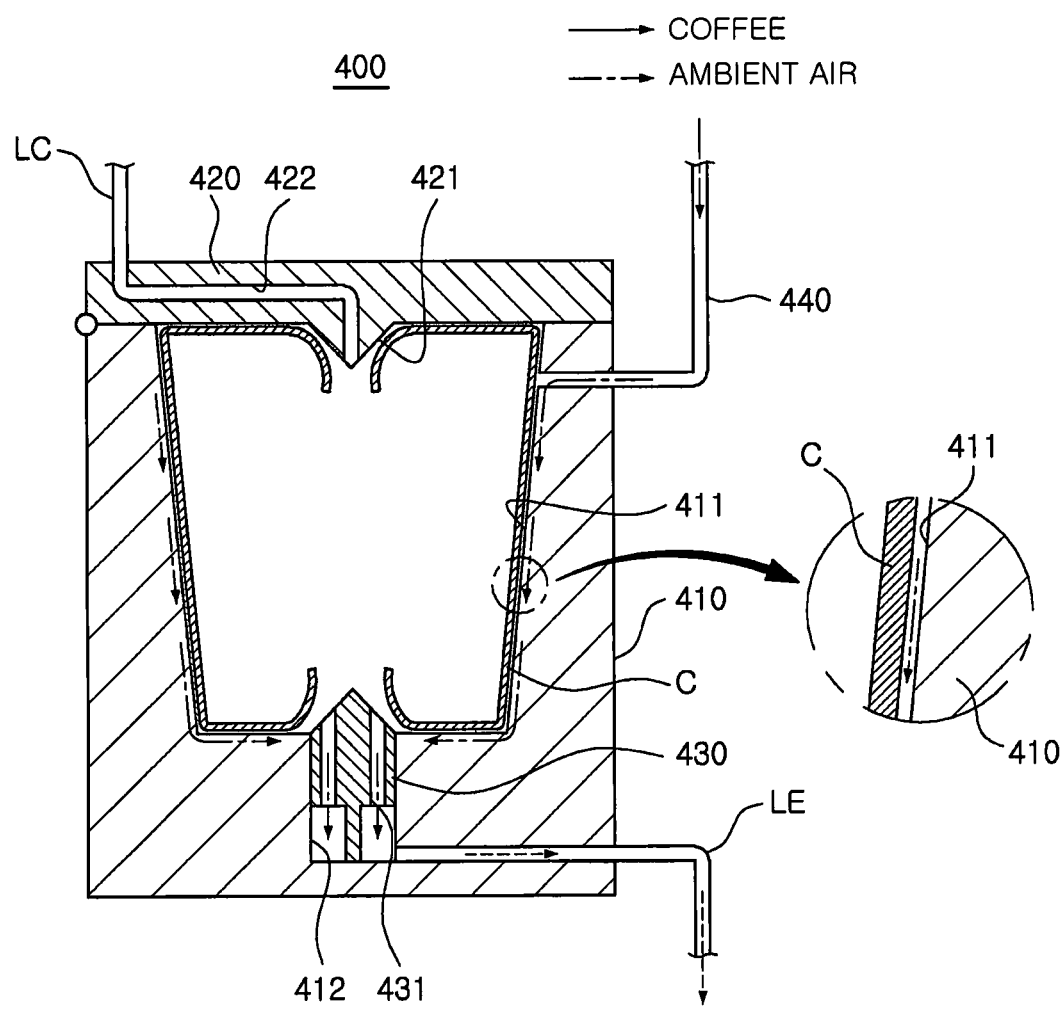

[Figure 6]
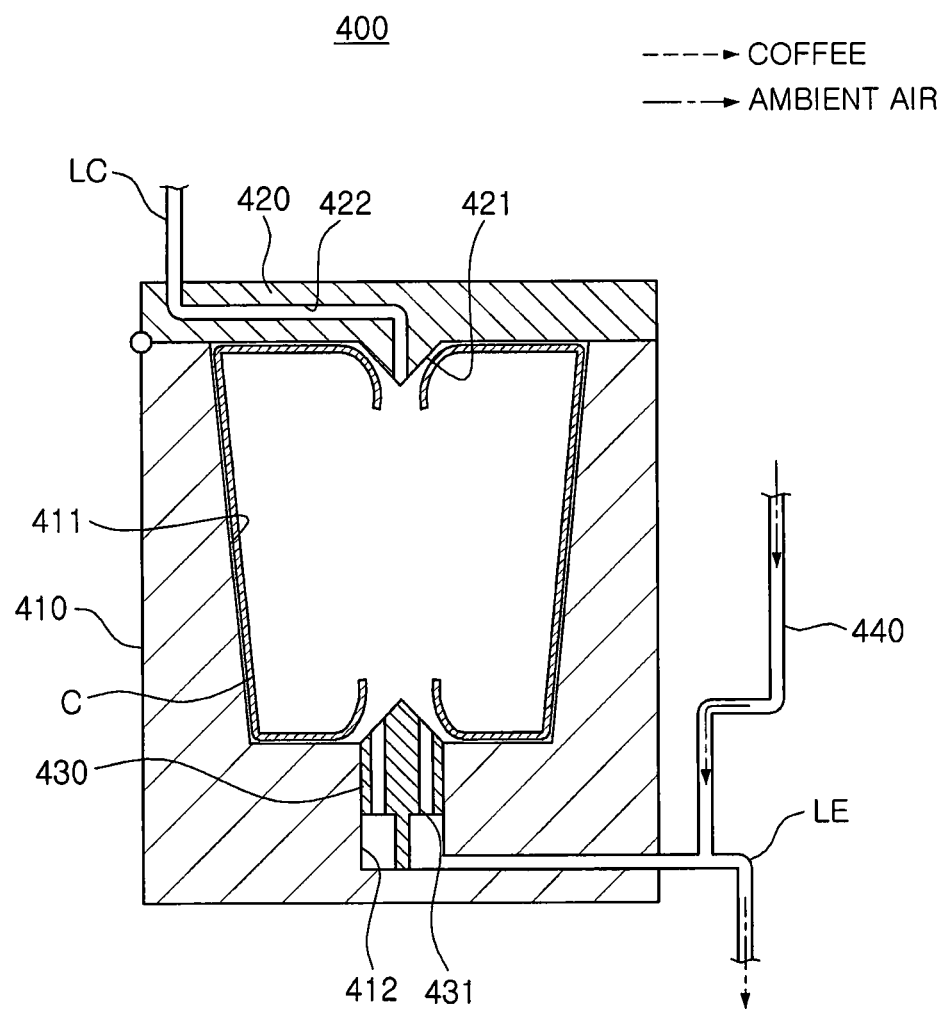

[Figure 7]
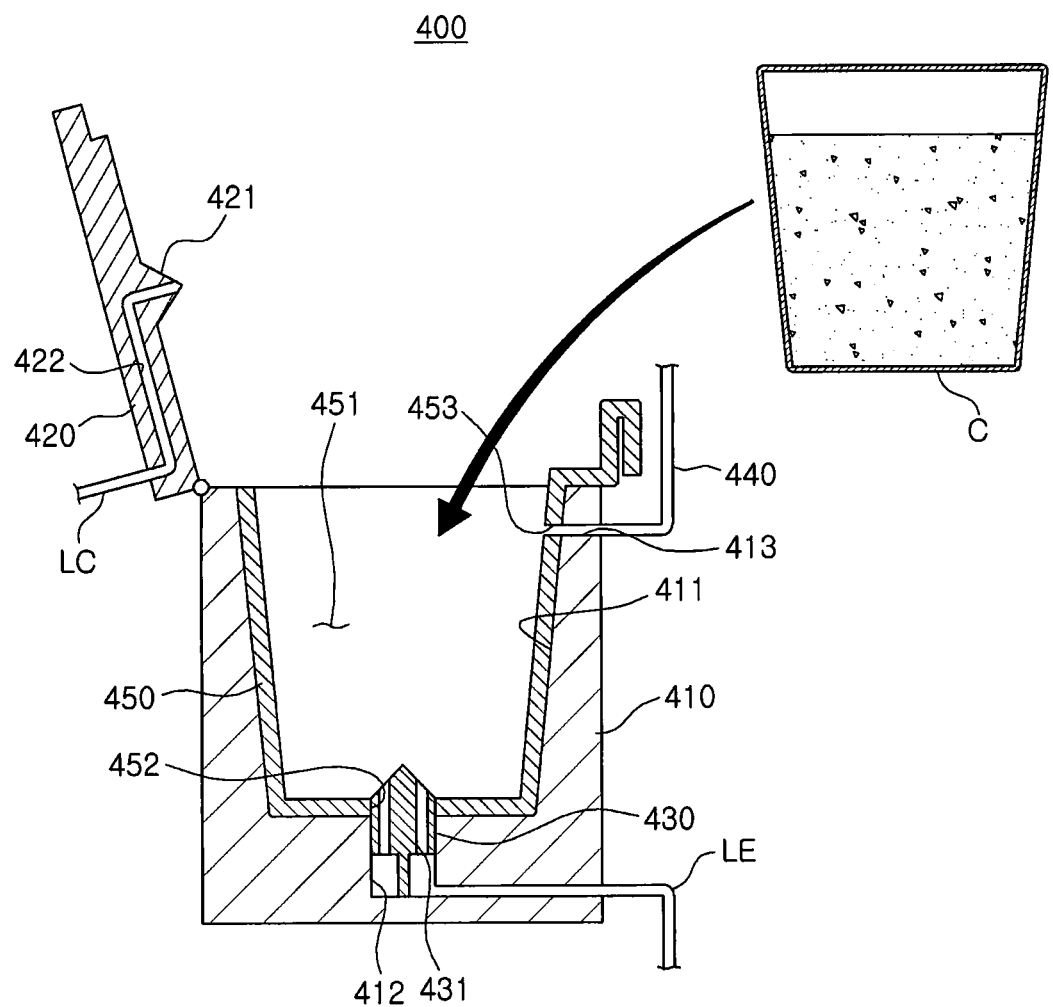

[Figure 8]
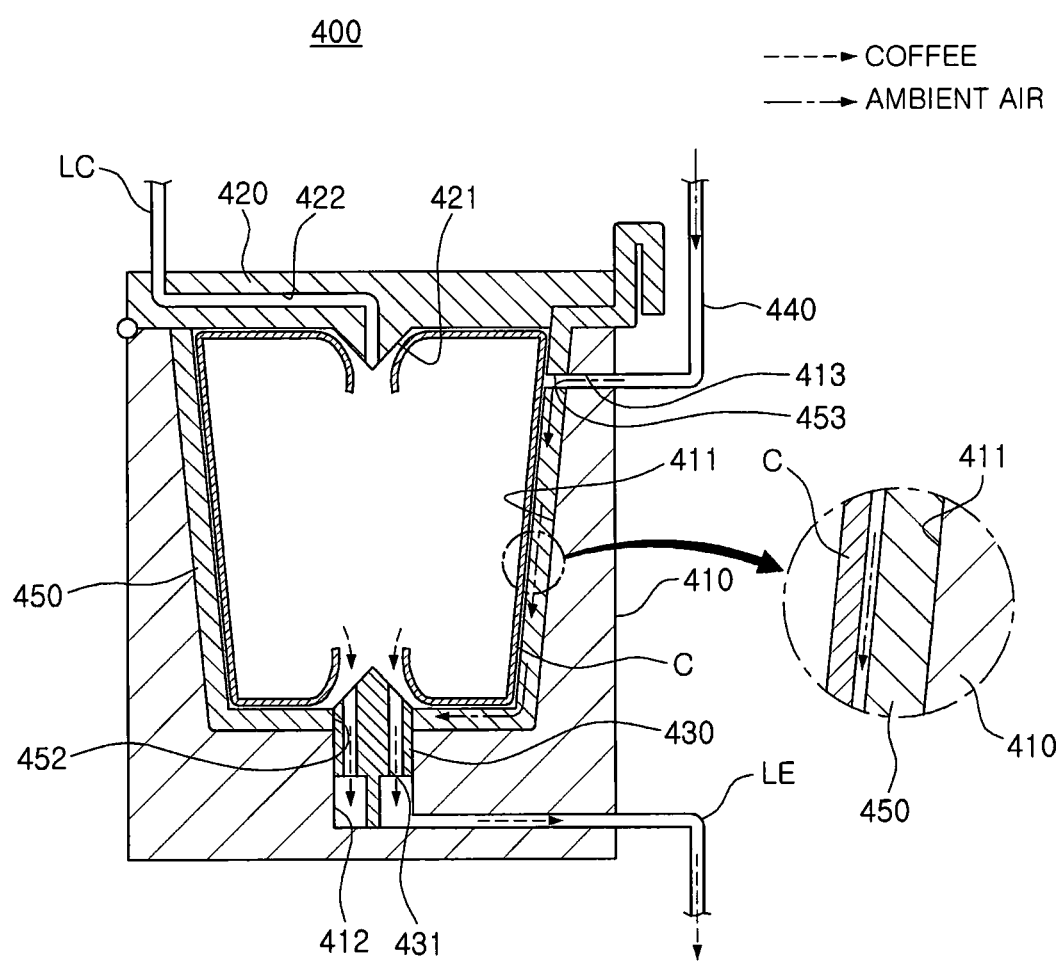

[Figure 9]
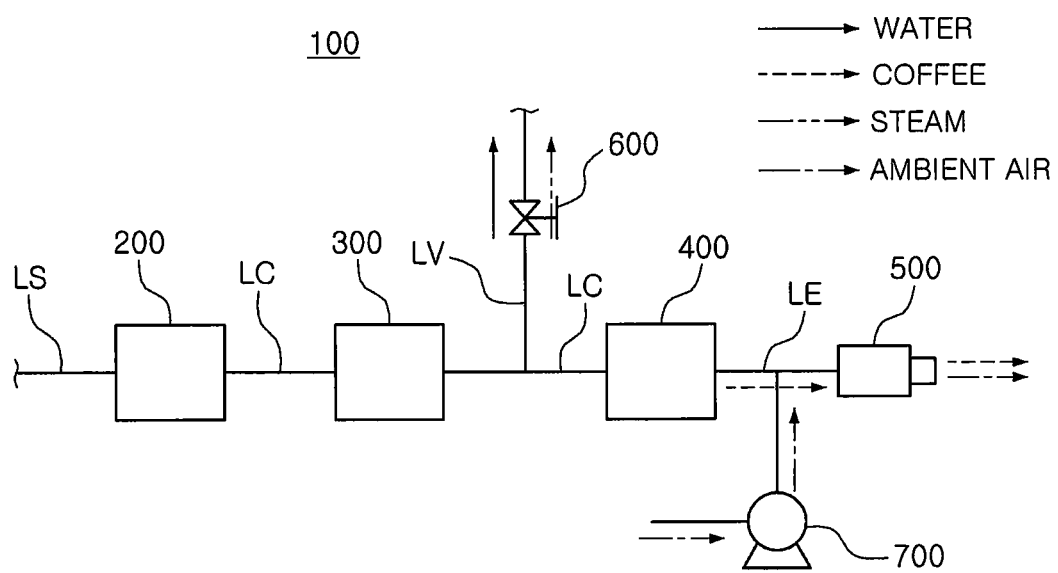

[Figure 10]
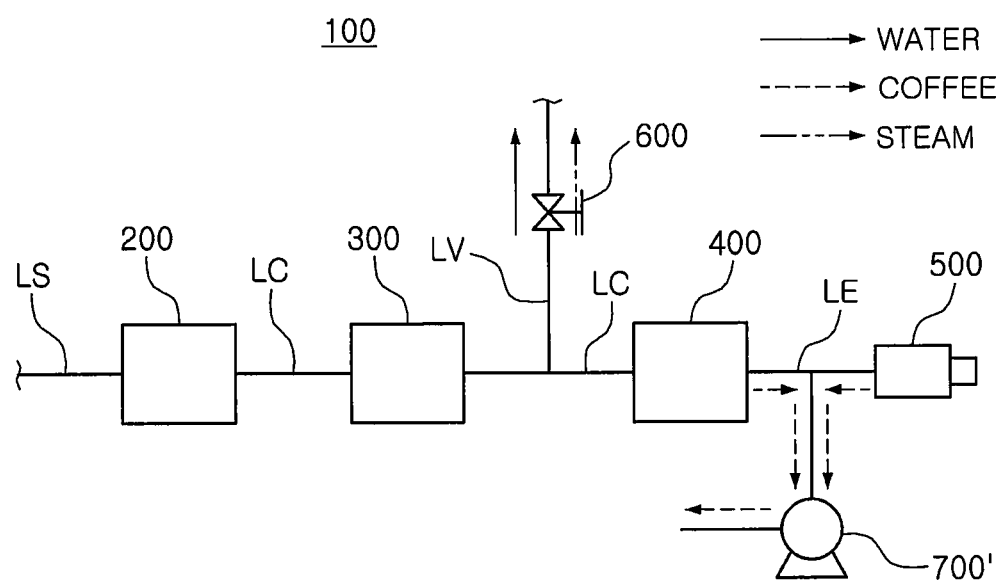

[Figure 11]
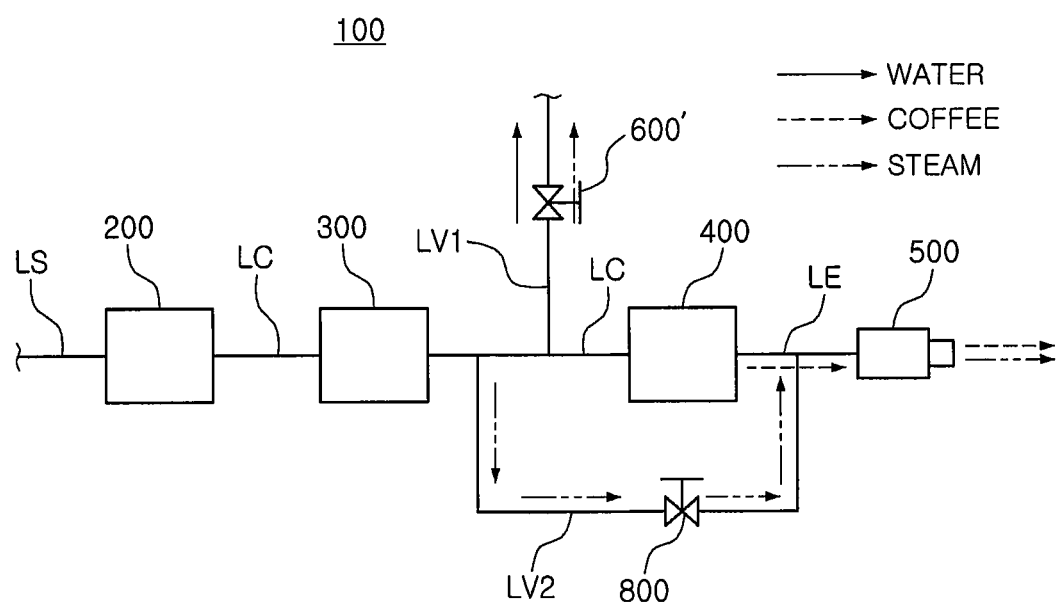

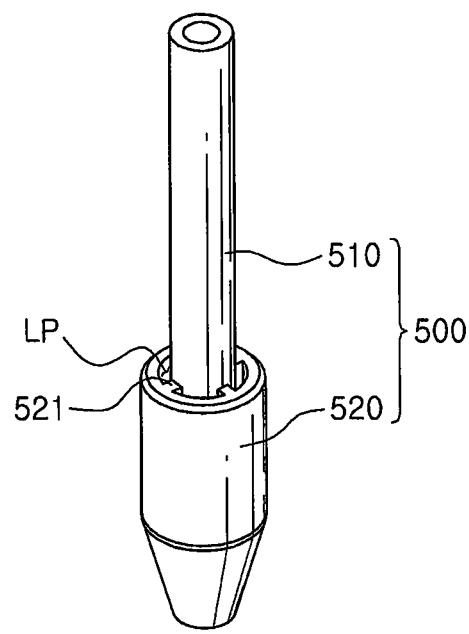
[Figure 12]

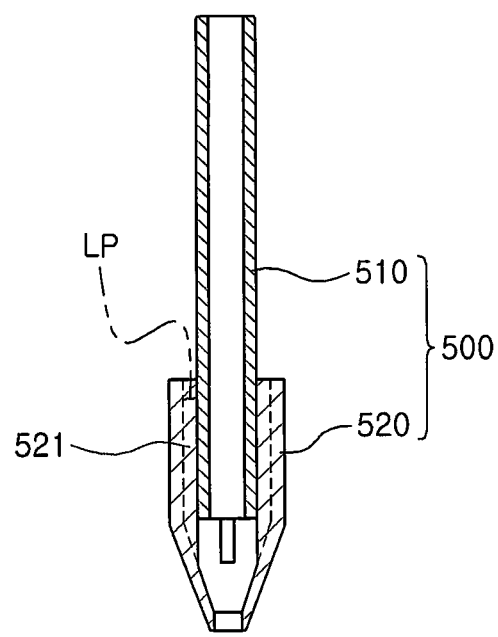
【Figure 13】

COFFEE EXTRACTION DEVICE

PRIORITY

This application is a National Phase Entry of PCT International Application No. PCT/KR2014/011638, which was filed on Dec. 1, 2014, and claims priority to Korean Patent Application No. 10-2013-0149952, which was filed on Dec. 4, 2013, and Korean Patent Application No. 10-2014-0166753, which was filed on Nov. 26, 2014, the contents of each of which are incorporated herein by reference.

TECHNICAL FIELD

The present disclosure relates to a coffee extracting device for extracting and supplying coffee to users, and more particularly, to a coffee extracting device capable of preventing coffee from being externally discharged after coffee extraction.

BACKGROUND ART

A coffee extracting device is a device extracting coffee and supplying the same to a user.

To this end, the coffee extracting device includes a coffee extracting unit extracting coffee by grinding coffee beans or extracting coffee using a coffee capsule.

Also, the coffee extracting device includes a pump and a heater heating water pressurized in the coffee extracting unit and supplying the same to extract coffee.

After coffee is extracted, coffee may remain in the coffee extracting unit, a discharge line connecting the coffee extracting unit and a discharge member discharging coffee, or the discharge member, and the like.

As mentioned above, since pressurized water is heated and supplied to the coffee extracting unit, predetermined pressure is formed during coffee extraction. Also, in a related art coffee extracting device, pressure formed in the coffee extracting unit is not completely released even after coffee extraction.

Thus, a problem in which remaining coffee is externally discharged even after coffee is extracted and supplied to a user arises.

DISCLOSURE

Technical Problem

The present disclosure is based upon recognition of the requirements and issues arising from the above-referenced related coffee extracting device.

An aspect of the present disclosure is to prevent coffee from being externally discharged after coffee is extracted.

Another aspect of the present disclosure is to prevent coffee from remaining after coffee is extracted.

Technical Solution

According to an aspect of the present invention, there is provided a coffee extracting device including: a pump connected to a water supply source and pressurizing water supplied from the water supply source; a heater heating water pressurized by the pump; a coffee extracting unit extracting coffee using water heated by the heater; and a discharge member externally discharging coffee which has been extracted by the coffee extracting unit, wherein a vent valve is provided between the heater and the coffee extracting unit, the vent valve being closed during coffee extraction and being opened after coffee extraction.

In an embodiment of the present disclosure, an ambient air intake pipe may be connected to the coffee extracting unit to allow ambient air to be introduced to the coffee extracting unit after coffee extraction.

In an embodiment of the present disclosure, the coffee extracting unit may extract coffee using a coffee capsule, and the ambient air intake pipe may be connected to an upper portion of a capsule insertion part formed at the coffee extracting unit to allow the coffee capsule to be inserted therein.

In an embodiment of the present disclosure, one end of the ambient air intake pipe may communicate with an interior of the coffee extracting unit and the other end of the ambient air intake pipe may communicate with ambient air.

In an embodiment of the present disclosure, the other end of the ambient air intake pipe may be positioned to be higher than the one end of the ambient air intake pipe.

In an embodiment of the present disclosure, the ambient air intake pipe may have a bent shape.

In an embodiment of the present disclosure, the coffee extracting unit and the discharge member may be connected by a discharge line, and an inner diameter of the ambient air intake pipe may be smaller than an inner diameter of the discharge line.

In an embodiment of the present disclosure, the coffee extracting unit and the discharge member may be connected by a discharge line, and an ambient air intake pipe may be connected to the discharge line in order to allow ambient air to be introduced to the discharge line after coffee extraction.

In an embodiment of the present disclosure, the coffee extracting unit may include a holder having an installation space allowing a coffee capsule to be installed therein and a unit body accommodating the holder, and through holes may be separately formed at mutually corresponding positions of the holder and the unit body to penetrate through an interior and an exterior of the coffee extracting unit.

In an embodiment of the present disclosure, an ambient air intake pipe allowing ambient air to be introduced to the interior of the holder may be connected to the through holes.

In an embodiment of the present disclosure, the coffee extracting unit and the discharge member may be connected by a discharge line, and a pressing pump may be connected to the discharge line in order to externally discharge coffee remaining in the discharge line through the discharge member after coffee extraction.

In an embodiment of the present disclosure, the coffee extracting unit and the discharge member may be connected by a discharge line, and an intake pump may be connected to the discharge line in order to externally discharge coffee remaining in the discharge line after coffee extraction.

According to an aspect of the present invention, there is provided a coffee extracting device including: a pump connected to a water supply source and pressurizing water supplied from the water supply source; a heater heating water pressurized by the pump; a coffee extracting unit extracting coffee using water heated by the heater; and a discharge member externally discharging coffee which has been extracted by the coffee extracting unit, wherein a first vent valve is provided between the heater and the coffee extracting unit, the first vent valve being closed during coffee extraction and being opened after coffee extraction, and a second vent valve is provided between the heater and the discharge member, the second vent valve being closed during coffee extraction and being opened after coffee extraction.

In an embodiment of the present disclosure, the heater and the coffee extracting unit may be connected by a connection line, the connection line may be connected to a first vent line, and the first vent valve may be provided in the first vent line.

In an embodiment of the present disclosure, the coffee extracting unit and the discharge member may be connected by a discharge line, the heater and the discharge line may be connected by a second vent line, and the second vent valve may be provided in the second vent line.

In an embodiment of the present disclosure, after coffee extraction, water or steam heated by the heater may be externally discharged from the discharge member through the second vent line and the discharge line.

In an embodiment of the present disclosure, a communication line allowing an interior and an exterior of the discharge member to communicate with each other may be provided in the discharge member.

In an embodiment of the present disclosure, the discharge member may include a discharge pipe receiving extracted coffee from the coffee extracting unit and an intake tube coupled to the discharge pipe and externally discharging coffee, and the intake tube may have a shape in which a top portion and a bottom portion thereof are open.

In an embodiment of the present disclosure, the communication line may be provided between the discharge pipe and the intake tube, and after coffee extraction, internal pressure of the intake tube and external pressure of the intake tube may be equal.

Advantageous Effects

According to an exemplary embodiment of the present disclosure, by providing a vent valve between the heater and the coffee extracting unit, pressure of the coffee extracting unit may be released after coffee extraction.

Also, according to an exemplary embodiment of the present disclosure, after coffee extraction, residual coffee may not be externally discharged.

Also, according to an exemplary embodiment of the present disclosure, since ambient air is introduced to the coffee extracting unit after coffee extraction, coffee may not remain in the coffee extracting unit.

BRIEF DESCRIPTION OF DRAWINGS

FIGS. 1 and 2 are schematic views illustrating operations of a coffee extracting device according to an exemplary embodiment in the present disclosure, wherein FIG. 1 illustrates a state when coffee is extracted, and FIG. 2 illustrates a state after coffee is extracted.

FIGS. 3 through 5 are schematic views illustrating a coffee extracting unit included in a coffee extracting device and operations thereof according to an exemplary embodiment in the present disclosure, wherein FIG. 3 illustrates a state before coffee is extracted, FIG. 4 illustrates a state when coffee is extracted, and FIG. 5 illustrates a state after coffee is extracted.

FIG. 6 is a schematic view illustrating a modified example of a connection position of an ambient air intake pipe provided in a coffee extracting device according to an exemplary embodiment in the present disclosure.

FIG. 7 is a schematic view illustrating a modified example of a coffee extracting unit provided in a coffee extracting device according to an exemplary embodiment in the present disclosure.

FIG. 8 is a schematic view illustrating an operation when coffee is extracted in the modified example of the coffee extracting unit illustrated in FIG. 7.

FIG. 9 is a schematic view illustrating an operation of a pressing pump provided in a coffee extracting device according to an exemplary embodiment in the present disclosure.

FIG. 10 is a schematic view illustrating an operation of an intake pump provided in a coffee extracting device according to an exemplary embodiment in the present disclosure.

FIG. 11 is a schematic view illustrating an operation of a first vent valve and a second vent valve of a coffee extracting device according to an exemplary embodiment in the present disclosure.

FIG. 12 is a perspective view of a discharge member provided in a coffee extracting device according to an exemplary embodiment in the present disclosure.

FIG. 13 is a cross-sectional view of a discharge member provided in a coffee extracting device according to an exemplary embodiment in the present disclosure.

BEST MODES

To help understand the foregoing features of the present disclosure, a coffee extracting device related to exemplary embodiments of the present disclosure will be described in detail with reference to the accompanying drawings.

Hereinafter, exemplary embodiments most appropriate to help in an understanding of the technical features of the present disclosure will be described, and the technical features of the present disclosure are not limited by the described exemplary embodiments and merely illustrate the implementation of the present disclosure through the exemplary embodiments described hereinafter. Thus, the present disclosure can be variably modified within the scope of the present disclosure through the exemplary embodiments described below, and such modifications are within the scope of the present disclosure. In order to help understand the exemplary embodiments described hereinafter, the like or similar reference numerals are used for relevant components among the components having the same function in the respective exemplary embodiments in the accompanying drawings.

FIGS. 1 and 2 are schematic views illustrating operations of a coffee extracting device according to an exemplary embodiment in the present disclosure, wherein FIG. 1 illustrates a state when coffee is extracted, and FIG. 2 illustrates a state after coffee is extracted.

FIGS. 3 through 5 are schematic views illustrating a coffee extracting unit included in a coffee extracting device and operations thereof according to an exemplary embodiment in the present disclosure, wherein FIG. 3 illustrates a state before coffee is extracted, FIG. 4 illustrates a state when coffee is extracted, and FIG. 5 illustrates a state after coffee is extracted.

A coffee extracting device 100 according to an exemplary embodiment in the present disclosure may include a pump 200, a heater 300, a coffee extracting unit 400, and a discharge member 500.

The pump 200 may be connected to a water supply source (not shown). As illustrated in FIG. 1, the pump 200 may be connected to the water supply source by a supply line LS.

In a case in which the coffee extracting device 100 according to an exemplary embodiment in the present disclosure is provided in a water treatment device (not shown) such as a water purifier, the water supply source to which the pump 200 is connected may be included in the water treatment device and may be a filtering unit including a water purification filter filtering water or a storage tank connected to the filtering unit and storing filtered water.

However, the water supply source to which the pump 200 is connected is not particularly limited, and any known water supply source may be used as long as it can supply water to the pump 200.

The heater 300 may heat water pressurized by the pump 200. To this end, as illustrated in FIG. 1, the heater 300 may be connected to the pump 200 by a connection line LC, and water pressurized by the pump 200 may be supplied thereto.

A configuration of the heater 300 is not particularly limited, and any known component may be used as long as it can heat water.

The coffee extracting unit 400 may extract coffee using water heated by the heater 300 as illustrated in FIGS. 1 and 4. To this end, the coffee extracting unit 400 may be connected to the heater 300 by a connection line LC and heated water from the heater 300 may be supplied to the coffee extracting unit 400.

As illustrated in FIGS. 3 and 4, in the coffee extracting unit 400, coffee may be extracted using a coffee capsule C.

To this end, as illustrated in FIGS. 3 through 5, the coffee extracting unit 400 may include a unit body 410 with an open upper portion and a cover 420 hermetically closing the open upper portion of the unit body 410.

As illustrated in FIGS. 3 through 5, a capsule insertion part 411, into which the coffee capsule C may be inserted, may be formed in the unit body 410. Also, a coffee discharge part 412, to which the capsule insertion part 411 and a discharge line LE are connected, may be formed in the unit body 410.

In a case in which the coffee capsule C is inserted into the capsule insertion part 411, a small gap may be formed between the coffee capsule C and the capsule insertion part 411 and may serve as a passage along which ambient air introduced through an ambient air intake pipe 440 as described hereinafter moves.

As illustrated, a piercing member 430 may be provided in the coffee discharge part 412. A coffee flow channel 431 may be penetratingly formed in the piercing member 430.

Thus, when the coffee capsule C is inserted into the capsule insertion part 411 of the unit body 410, a lower surface of the coffee capsule C may be pierced by the piercing member 430. Coffee extracted from the coffee capsule C may then move to the coffee discharge part 412 through the coffee flow channel 431 of the piercing member 430.

A piercing part 421 may be formed on the cover 420. Also, a water supply flow channel 422 connected to the connection line LC may be formed in the cover 420 and the piercing part 421. The cover 420 may be connected to the unit body 410 in a pivoted manner.

Accordingly, as illustrated in FIGS. 3 and 4, the capsule insertion part 411 may be hermetically closed by closing the open upper portion of the unit body 410 by rotating the cover 420. Also, as illustrated in FIG. 4, an upper surface of the coffee capsule C may be pierced by the piercing part 421 of the cover 420.

Through this configuration, as illustrated in FIG. 3, in a state in which the cover 420 is rotated to open an upper portion of the unit body 410, the coffee capsule C is inserted into the capsule insertion part 411 of the unit body 410. Thereafter, as illustrated in FIG. 4, in a state in which the coffee capsule C is inserted in the capsule insertion part 411 of the unit body 410, the cover 420 is rotated to close the upper portion of the unit body 410 to hermetically close the capsule insertion part 411.

Thereafter, as illustrated in FIG. 4, water heated by the heater 300 is supplied to the water supply flow channel 422 through the connection line LC connected to the heater 300, the heated water may be supplied to the coffee capsule C, and coffee may be extracted. Also, coffee extracted from the coffee capsule C may move to the coffee discharge part 412 through the coffee flow channel 431 of the piercing member 430 and subsequently move to the discharge line LE connected to the coffee discharge part 412.

However, a configuration of the coffee extracting unit 400 is not particularly limited, and any known configuration such as extracting coffee by grinding coffee beans may also be adopted.

The discharge member 500 may discharge coffee extracted from the coffee extracting unit 400 externally. To this end, as illustrated in FIG. 1, the discharge member 500 may be connected to the coffee extracting unit 400 by a discharge line LE. Accordingly, as illustrated in FIG. 4, coffee extracted from the coffee extracting unit 400 may move along the discharge line LE and be externally discharged through the discharge member 500. The coffee may then be supplied to a user.

Meanwhile, a vent valve 600 may be provided between the heater 300 and the coffee extracting unit 400. As illustrated in FIG. 1, a vent line LV may be connected to the connection line LC connecting the heater 300 and the coffee extracting unit 400, and a vent valve 600 may be provided in the vent line LV.

The vent valve 600 is closed when coffee is extracted as illustrated in FIG. 1, and opened after coffee is extracted as illustrated in FIG. 2. Accordingly, after coffee extraction, heated water or steam present in the connection line LC connecting the heater 300 and the coffee extracting unit 400 may be externally discharged through the vent valve 600. Also, pressure of the coffee extracting unit 400 may be released.

Accordingly, after coffee is extracted, coffee remaining in the coffee extracting unit 400, in the discharge line LE connecting the coffee extracting unit 400 and the discharge member 500, or in the discharge member 500 may not be externally discharged.

Also, as illustrated in FIGS. 3 through 5, an ambient air intake pipe 440 may be connected to the coffee extracting unit 400. As illustrated, the ambient air intake pipe 440 may be connected to an upper portion of the capsule insertion part 411 of the coffee extracting unit 400.

One end of the ambient air intake pipe 440 may be connected to an interior of the coffee extracting unit 400, and the other end of the ambient air intake pipe 440 may communicate with ambient air. The ambient air intake pipe 440 may be closed when coffee is extracted and opened after coffee is extracted.

As illustrated in FIG. 5, ambient air may be introduced to the capsule insertion part 411 of the coffee extracting unit 400 through the ambient air intake pipe 440. In this manner, coffee remaining in the coffee extracting unit 400, the discharge line LE, or the discharge member 500 may be externally discharged by ambient air introduced through the ambient air intake pipe 440. That is, even residual coffee may also be supplied to the user.

Thus, after coffee extraction, coffee may not remain in the coffee extracting unit 400, the discharge line LE, or the discharge member 500, and since coffee does not remain, coffee is not externally discharged after coffee extraction.

Meanwhile, in order to prevent coffee remaining in the coffee extracting unit 400 from flowing backwards to be discharged through the ambient air intake pipe 440 after coffee extraction, the other end of the ambient air intake pipe 440 may be positioned to be higher than one end of the ambient air intake pipe 440, and may have a bent shape. Also, an inner diameter of the ambient air intake pipe 440 may be smaller than an inner diameter of the discharge line LE.

FIG. 6 is a schematic view illustrating a modified example of a connection position of an ambient air intake pipe provided in a coffee extracting device according to an exemplary embodiment in the present disclosure, FIG. 7 is a schematic view illustrating a modified example of a coffee extracting unit provided in a coffee extracting device according to an exemplary embodiment in the present disclosure, and FIG. 8 is a schematic view illustrating an operation when coffee is extracted in the modified example of the coffee extracting unit illustrated in FIG. 7.

In FIGS. 3 through 5, the ambient air intake pipe 440 is connected to the coffee extracting unit 400, but the present disclosure is not limited thereto, and the ambient air intake pipe 440 may be connected to the discharge line LE as illustrated in FIG. 6.

In this case, after coffee is extracted, coffee remaining in the discharge line LE or discharge member 500 may be externally discharged by ambient air introduced through the ambient air intake pipe 440.

Also, referring to FIG. 7, the coffee extracting unit 400 may further include a holder 450.

The holder 450 may be inserted into the capsule insertion part 411 through the open upper portion of the unit body 410, an installation space 451 may be formed in the holder 450, and the coffee capsule C may be installed in the installation space 451.

A guide hole 452 may be provided on a lower surface of the holder 450, and the piercing member 430 may be inserted into the holder 450 through the guide hole 452, and accordingly, the coffee capsule C inserted into the installation space 451 of the holder 450 may be pierced by the piercing member 430.

Also, through holes 453 and 413 may be separately provided in mutually corresponding positions of the holder 450 and the unit body 410, and thus the through holes 453 and 413 penetrate through an interior and an exterior of the coffee extracting unit 400.

The ambient air intake pipe 440 allowing ambient air to be introduced to the interior of the holder 450 may be connected to the through holes 453 and 413, and as illustrated in FIG. 7, after coffee is extracted, ambient air may be introduced to the installation space 451 of the holder 450 through the ambient air intake pipe 440.

At least a portion of the coffee capsule C may not be tightly attached to the holder 450, and accordingly, a small gap may be formed between the coffee capsule C and the holder 450. Such a gap may serve as a passage along which ambient air may move after coffee extraction.

In this manner, after coffee extraction, coffee remaining in the coffee extracting unit 400, the discharge line LE, or the discharge member 500 may be externally discharged by ambient air introduced through the ambient air intake pipe 440.

FIG. 9 is a schematic view illustrating an operation of a pressing pump provided in a coffee extracting device according to an exemplary embodiment in the present disclosure, and FIG. 10 is a schematic view illustrating an operation of an intake pump provided in a coffee extracting device according to an exemplary embodiment in the present disclosure.

Referring to FIGS. 9 and 10, the coffee extracting device 100 according to an exemplary embodiment in the present disclosure may further include a pressing pump 700 or an intake pump 700'.

Even though internal pressure of the coffee extracting unit 400 is released by the vent valve 500 after coffee extraction, coffee may remain in the coffee extracting unit 400, the discharge line LE, or the discharge member 500.

The residual coffee may be externally discharged by ambient air introduced through the ambient air intake pipe 440 described above with reference to FIGS. 3 through 7, and here, in order to more effectively discharge residual coffee, the pressing pump 700 or the suction pump 700' may be connected to the discharge line LE.

The residual coffee may be externally discharged from the discharge member 500 through the discharge line LE by the operation of the pressing pump 700. Also, residual coffee may be externally discharged from a discharge unit (not shown) through the discharge line LE by the operation of the suction pump 700'.

In this manner, after coffee extraction, since coffee remaining within the coffee extracting device 100 is externally discharged, proliferation of germs bacteria, or microorganisms due to residual coffee may be prevented, and hygiene properties may be enhanced.

FIG. 11 is a schematic view illustrating an operation of a first vent valve and a second vent valve of a coffee extracting device according to an exemplary embodiment in the present disclosure.

Referring to FIG. 11, a first vent valve 600' may be provided between the heater 300 and the coffee extracting unit 400. For example, a first vent line LV1 may be connected to the connection line LC connecting the heater 300 and the coffee extracting unit 400, and the first vent valve 600' may be connected to the first vent line LV1.

The first vent valve 600' may be closed when coffee is extracted, and may be opened after coffee is extracted. Accordingly, after coffee extraction, heated water or steam present in the connection line LC connecting the heater 300 and the coffee extracting unit 400 may be externally discharged through the first vent valve 600'. Also, pressure of the coffee extracting unit 400 may be released.

Also, a second vent valve 800 may be provided between the heater 300 and the discharge member 500. For example, a second vent line LV2 connecting the connection line LC connecting the heater 300 and the coffee extracting unit 400 and the discharge line LE connecting the coffee extracting unit 400 and the discharge member 500 may be provided, and the second vent valve 800 may be provided in the second vent line LV2.

The second vent valve 800 may be closed when coffee is extracted, and opened after coffee is extracted.

Thus, during coffee extraction, water or steam supplied from the heater 300 may not flow to the second vent line LV2, and after coffee extraction, water or steam supplied from the heater 300 may be externally discharged from the discharge member 500 through the second vent line LV2 and the discharge line LE. Accordingly, after coffee extraction, coffee remaining in the discharge line LE or the discharge member 500 may be externally discharged.

FIG. 12 is a perspective view of a discharge member provided in a coffee extracting device according to an exemplary embodiment in the present disclosure, and FIG. 13 is a cross-sectional view of a discharge member provided in a coffee extracting device according to an exemplary embodiment in the present disclosure.

Referring to FIGS. 12 and 13, the discharge member 500 may include a discharge pipe 510 receiving extracted coffee from the coffee extracting unit 400 and an intake tube 520 coupled to the discharge pipe 510 and externally discharging coffee.

Here, the intake tube 520 may have a shape in which a top portion and a bottom portion thereof are open, and the discharge pipe 510 may be coupled to the intake tube 520 through the open upper portion of the intake tube 520.

A protrusion 521 protruding toward the discharge pipe 510 may be provided on an inner surface of the intake tube 520, and the discharge pipe 510 may be tightly coupled to the protrusion 521 so as to be coupled to the intake tube 520. Here, as a coupling scheme of the discharge pipe 510 and the protrusion 521, various schemes such as a press-fit scheme and a screw-fastening scheme may be applied.

Meanwhile, due to a space between the protrusions 521, the upper portion of the intake tube 520 may remain open, and accordingly, an interior and an exterior of the intake tube 520 may communicate with each other.

That is, a communication line LP may be provided in the discharge member 500 to allow an interior and an exterior of the discharge member 500 to communicate with each other.

In the present exemplary embodiment, a space between the protrusions 521 protruding from the inner surface of the intake tube 520 may serve as the communication line LP.

Due to the communication line LP, internal pressure of the intake tube 520 may be equal to external pressure of the intake tube 520, and thus, after coffee extraction, coffee may not remain within the intake tube 520.

As described above, when the coffee extracting device according to an exemplary embodiment of the present disclosure is used, pressure of the coffee extracting unit may be released after coffee extraction, residual coffee may not be externally discharged after coffee extraction, and coffee may not remain after coffee extraction.

The configurations of the coffee extracting device according to the exemplary embodiments of the present disclosure described above are not limited in its application, but the entirety or a portion of the exemplary embodiments may be selectively combined to be configured into various modifications.

The invention claimed is:

1. A coffee extracting device comprising:
a pump connected to a water supply source and pressurizing water supplied from the water supply source;
a heater heating water pressurized by the pump;
a coffee extracting unit extracting coffee using water heated by the heater; and
a discharge member externally discharging coffee which has been extracted by the coffee extracting unit,
wherein a first vent valve is provided between the heater and the coffee extracting unit, the first vent valve being closed during coffee extraction and being opened to externally discharge heated water or steam remaining in a connection line connecting the heater and the coffee extracting unit after coffee extraction, and a second vent valve is provided between the heater and the discharge member, the second vent valve being closed during coffee extraction and being opened to externally discharge coffee remaining in a discharge line connecting the coffee extracting unit and the discharge member after coffee extraction,
wherein the heater and the discharge line are connected by a second vent line, and the second vent valve is provided in the second vent line, and
wherein a first ambient air intake pipe is connected to the discharge line in order to allow ambient air to be introduced to the discharge line after coffee extraction.

2. The coffee extracting device of claim 1, wherein a second ambient air intake pipe is connected to the coffee extracting unit to allow ambient air to be introduced to the coffee extracting unit after coffee extraction.

3. The coffee extracting device of claim 2, wherein the coffee extracting unit extracts coffee using a coffee capsule, and
the second ambient air intake pipe is connected to an upper portion of a capsule insertion part formed at the coffee extracting unit to allow the coffee capsule to be inserted therein.

4. The coffee extracting device of claim 2, wherein one end of the second ambient air intake pipe communicates with an interior of the coffee extracting unit and the other end of the second ambient air intake pipe communicates with ambient air.

5. The coffee extracting device of claim 4, wherein the other end of the second ambient air intake pipe is positioned to be higher than the one end of the second ambient air intake pipe.

6. The coffee extracting device of claim 4, wherein the second ambient air intake pipe has a bent shape.

7. The coffee extracting device of claim 2, wherein an inner diameter of the second ambient air intake pipe is smaller than an inner diameter of the discharge line.

8. The coffee extracting device of claim 1, wherein the coffee extracting unit includes a holder having an installation space allowing a coffee capsule to be installed therein and a unit body accommodating the holder, and
through holes are separately formed at mutually corresponding positions of the holder and the unit body to penetrate through an interior and an exterior of the coffee extracting unit.

9. The coffee extracting device of claim 8, wherein a third ambient air intake pipe allowing ambient air to be introduced to the interior of the holder is connected to the through holes.

10. The coffee extracting device of claim 1, wherein a pressing pump is connected to the discharge line in order to externally discharge coffee remaining in the discharge line through the discharge member after coffee extraction.

11. The coffee extracting device of claim 1, wherein an intake pump is connected to the discharge line in order to externally discharge coffee remaining in the discharge line after coffee extraction.

12. The coffee extracting device of claim 1, wherein the connection line is connected to a first vent line, and the first vent valve is provided in the first vent line.

13. The coffee extracting device of claim 1, wherein after coffee extraction, water or steam heated by the heater is externally discharged from the discharge member through the second vent line and the discharge line.

14. The coffee extracting device of claim 1, wherein a communication line allowing an interior and an exterior of the discharge member to communicate with each other is provided in the discharge member.

15. The coffee extracting device of claim 14, wherein
the discharge member includes a discharge pipe receiving extracted coffee from the coffee extracting unit and an intake tube coupled to the discharge pipe and externally discharging coffee, and
the intake tube has a shape in which a top portion and a bottom portion thereof are open.

16. The coffee extracting device of claim 15, wherein
the communication line is provided between the discharge pipe and the intake tube, and
after coffee extraction, internal pressure of the intake tube and external pressure of the intake tube are equal.

\* \* \* \* \*